Figure 1:
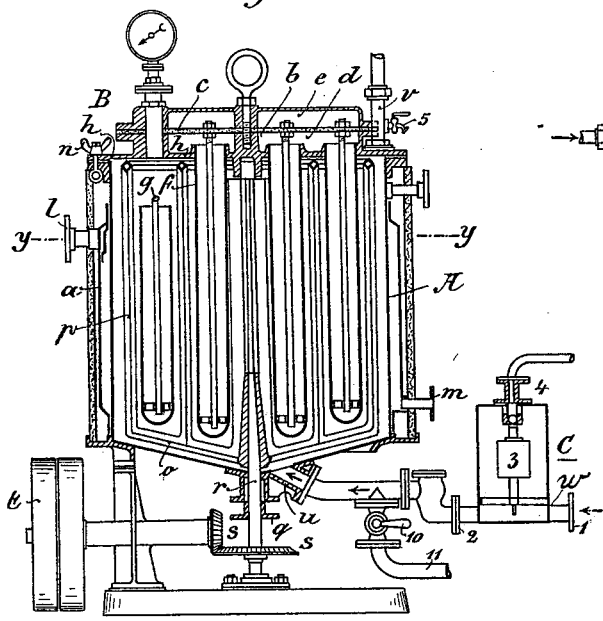

(No Model.) 5 Sheets—Sheet 1.
F. A. KLEEMANN.
APPARATUS FOR STERILIZATION OF MILK OR OTHER LIQUIDS.
No. 544,437. Patented Aug. 13, 1895.

Witnesses:

Inventor:
Fritz August Kleemann,
By H. A. de Vos.
Attorney (No Model.) 5 Sheets—Sheet 2.
F. A. KLEEMANN.
APPARATUS FOR STERILIZATION OF MILK OR OTHER LIQUIDS.
No. 544,437. Patented Aug. 13, 1895.
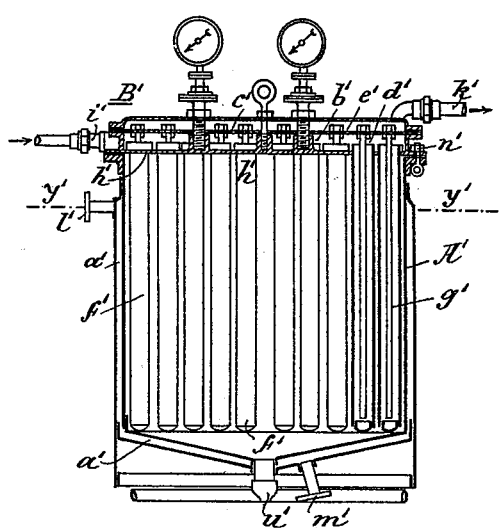
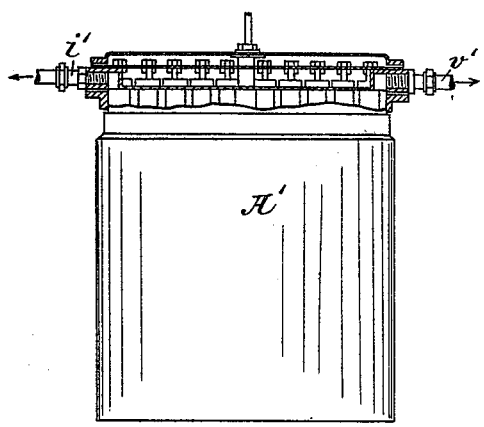
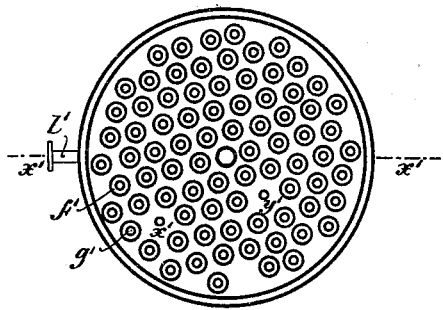
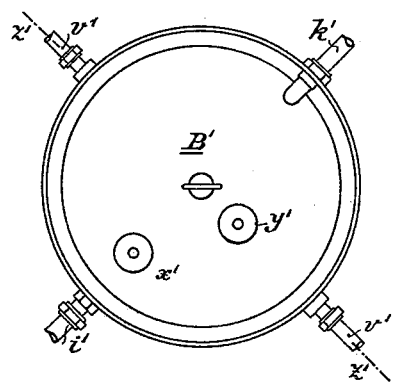
Witnesses:
Inventor:
Fritz August Kleemann,
By H. A. deVos.
Attorney.

F. A. KLEEMANN.
APPARATUS FOR STERILIZATION OF MILK OR OTHER LIQUIDS.
No. 544,437. Patented Aug. 13, 1895.
Fig. 5ᵃ.
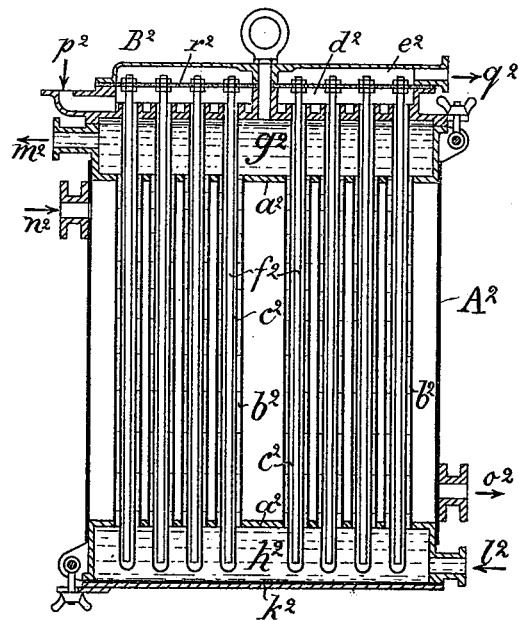
Fig. 6ᵃ.
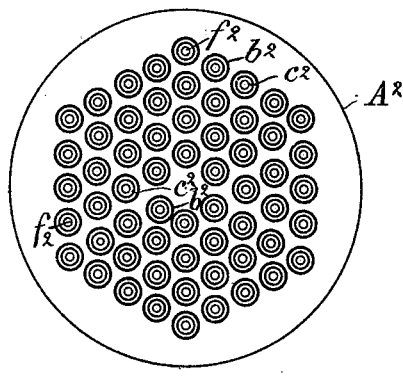
Witnesses:
Inventor:
Fritz August Kleemann,
By H. A. de Vos.
Attorney.

(No Model.) 5 Sheets—Sheet 4.
F. A. KLEEMANN.
APPARATUS FOR STERILIZATION OF MILK OR OTHER LIQUIDS.
No. 544,437. Patented Aug. 13, 1895.
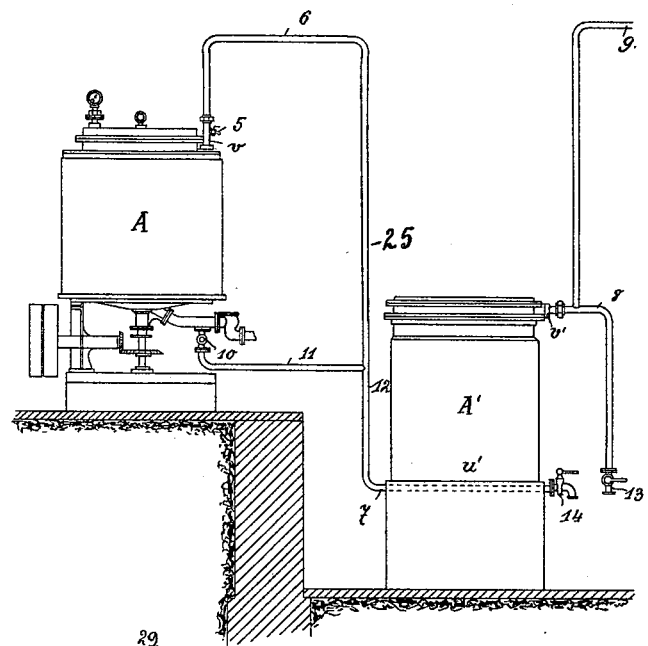
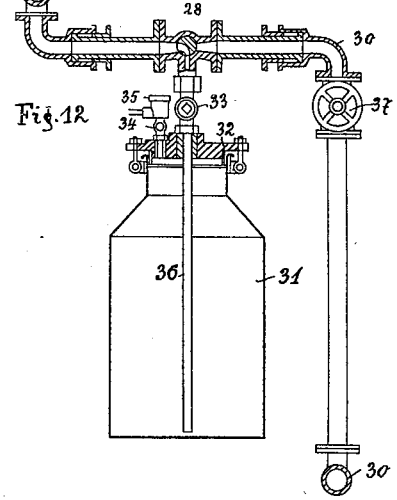
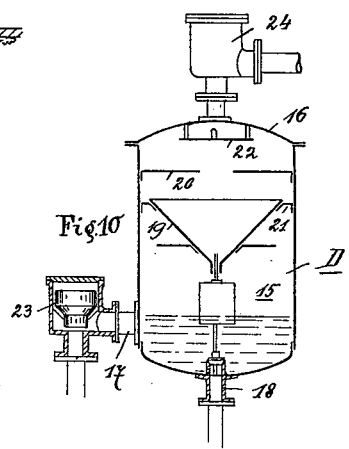
Witnesses:
Inventor:
Fritz August Kleemann,
By H. A. de Vos
Attorney (No Model.) 5 Sheets—Sheet 5.
F. A. KLEEMANN.
APPARATUS FOR STERILIZATION OF MILK OR OTHER LIQUIDS.
No. 544,437. Patented Aug. 13, 1895.
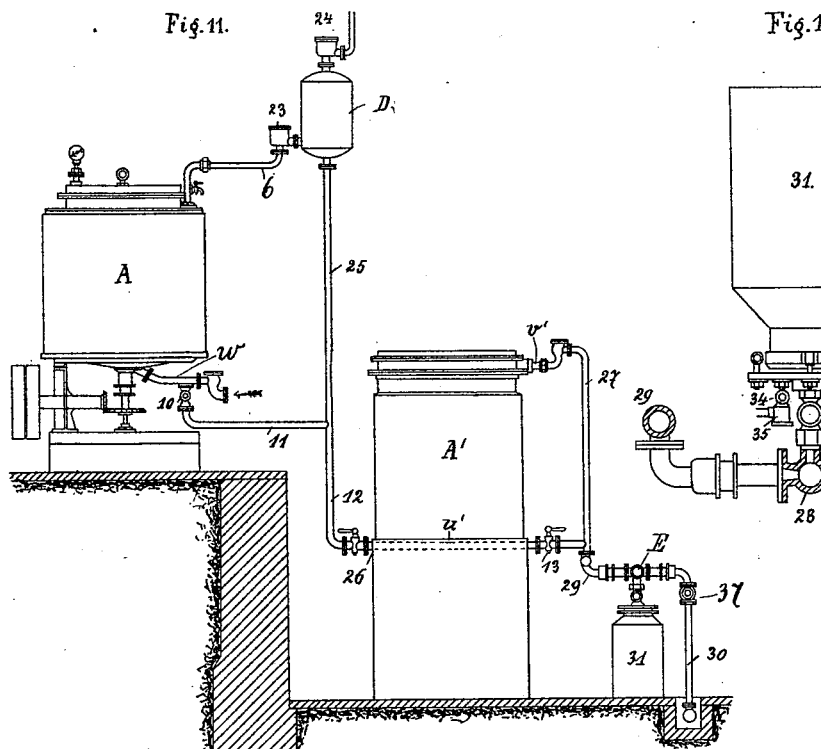
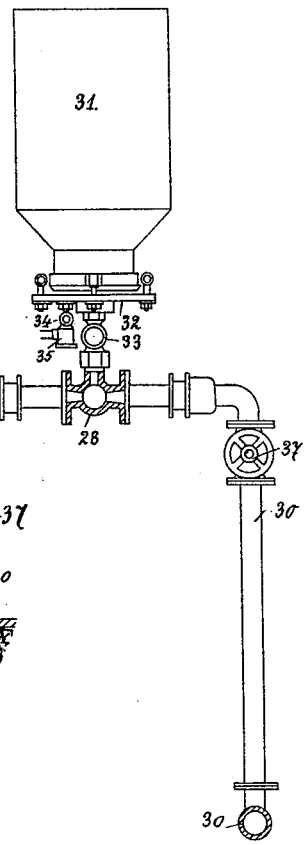
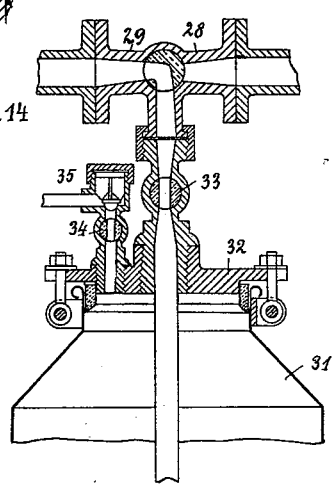
Witnesses:
Inventor:
Fritz August Kleemann,
By H. H. de Vos,
Attorney.

UNITED STATES PATENT OFFICE.

FRITZ AUGUST KLEEMANN, OF BERLIN, GERMANY, ASSIGNOR TO KLEEMANN & CO., OF SAME PLACE.

APPARATUS FOR STERILIZATION OF MILK OR OTHER LIQUIDS.

SPECIFICATION forming part of Letters Patent No. 544,437, dated August 13, 1895.

Application filed May 15, 1894. Serial No. 511,319. (No model.)

*To all whom it may concern:*

Be it known that I, FRITZ AUGUST KLEEMANN, a subject of the Emperor of Germany, residing at Berlin, German Empire, have invented certain new and useful Improvements in Apparatus for the Sterilization of Milk and other Liquids, of which the following is a specification, such as will enable others skilled in the art to which it appertains to make and use the same.

The objects of my invention are, first, to provide an apparatus for the sterilization or pasteurization of milk and other liquids continuously during the flow thereof through the apparatus used; second, to provide an economical apparatus for quickly and cheaply cooling the liquid after so sterilizing the same, and, third, to provide an apparatus for cleansing and sterilizing the shipping-vessels and for introducing the sterilized liquid into the same without bringing the liquid so sterilized into contact with the atmosphere.

In order to thoroughly sterilize or pasteurize liquids it is absolutely essential that the same should be kept for a more or less extended period of time at a suitable maximum temperature without appreciable variation thereof, for the reason that if the temperature is allowed to fall below such maximum the germs will not all be killed, while if it is allowed to rise above the same the liquid will in many cases be made unfit for use by reason of burning, &c. I overcome the objections stated and bring about the results sought by providing an apparatus in which the liquid to be sterilized in flowing through the apparatus is kept for a long time in contact with heating and then with cooling surfaces, which surfaces are preferably heated and cooled by currents of heating or cooling liquids flowing through the apparatus in a direction counter to the flow of the liquid to be sterilized; and to that end my invention consists of the apparatus shown and described in the following specification, of which the accompanying drawings form a part, wherein similar numerals of reference designate like or equivalent parts wherever found throughout the several views, and in which—

Figure 3:
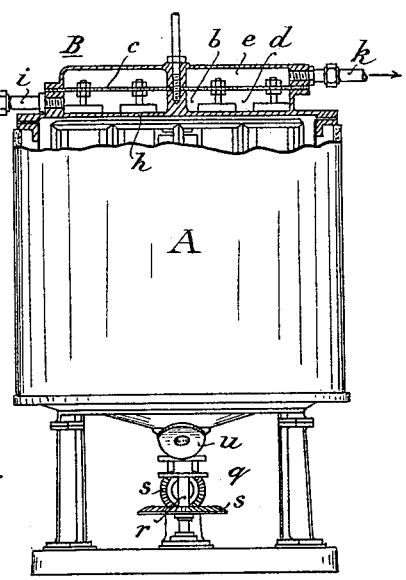
Figure 2:
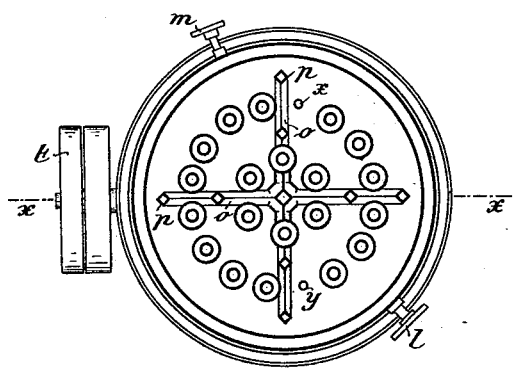
Figure 4:
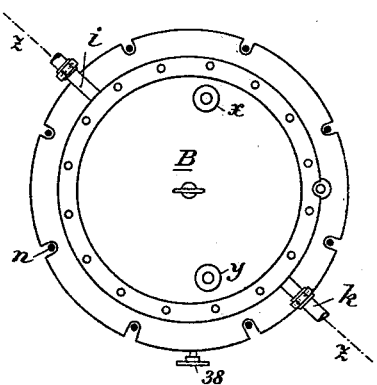

Figure 1 is a section of the heater on the line $x\,x$ of Fig. 2, also illustrating an intermediate device required for the treatment of skim-milk. Fig. 2, a section thereof on the line $y\,y$ of Fig. 1; Fig. 3, a like section on the line $z\,z$ of Fig. 4; Fig. 4, a top view of such heater; Fig. 5, a section of the cooler on the line $x'\,x'$ of Fig. 6; Fig. 6, a section thereof on the line $y'\,y'$ of Fig. 5; Fig. 7, a section thereof on the line $z'\,z'$ of Fig. 8, and Fig. 8 a top view of such cooler. Fig. 9 is a side view in elevation of the entire apparatus in position and ready for operation. Fig. 10 is a detail view of a foam-trap to be used in connection with the apparatus, and Fig. 11 is a side view in elevation of the entire apparatus, showing such foam-trap and the shipping can or receptacle attached thereto. Figs. 12 and 13 are views in detail of the shipping can or receptacle in different positions, showing the arrangements for connecting same with the can-cleansing and with the cooling devices, and Fig. 14 is a sectional view of such can connections. Fig. $5^a$ is a view in central vertical section of a modified form of heater, which may also be used as a cooler, if desired, and Fig. $6^a$ is a view thereof in central horizontal section.

Referring to the drawings, the heater consists of a preferably upright and cylindrical receptacle A, wherein the skim-milk to be heated is placed, and of a specially constructed heating-body B that heats the milk either alone or in combination with a heating-mantle $a$, arranged around the cylindrical part of the receptacle A. The heating-body B is hollow and the cavity $b$ is divided by means of the horizontal plate C in two closed chambers $d$ and $e$ rigidly connected with the tubes $f$ and $g$. The tubes $f$ are closed at their lower ends and open at the upper end and are there tightly inserted in the bottom plate $h$ of the heating-body, so that they communicate only with the lower chamber $d$. The tubes $g$ are open at both ends and are at their upper end tightly inserted in the plate $c$ in such way that they are centrally located in the tubes $f$, their lower end nearly reaching down to the bottom of the tubes $f$.

For heating I preferably use steam, but any other liquid or gaseous medium may be used. The heating medium is always conducted through the pipe $i$, Fig. 3, into the lower chamber $d$, passes downwardly through the tubes $f$, and flows as condensed water or as cooled liquid through the narrower tube $g$ into the upper room $e$, from where it is discharged through the pipe $k$. The heating medium is also admitted into the heating-mantle $a$ by way of the pipe $l$, and is discharged through the pipe $m$. In this manner I obtain suspended or perpendicular heating-surfaces for the milk. The bottom $h$ of the heating-body is formed as a cover for the receptacle A and is tightly fitted on the same by means of readily-removable thumb-screws $n$.

Within the receptacle A is provided a stirrer $o$, the upright arms $p$ of which move in the concentric spaces between the tubes $f$ and between the tubes and the wall of the receptacle. The stirrer $o$ is formed in one piece and is arranged in such manner upon the shaft $r$, passed through the bottom of the receptacle by means of the stuffing-box $q$, that it can be easily lifted from said shaft. The shaft $r$ may be turned by conical gear-wheels $s$ and a pulley $t$.

The milk flows into the receptacle A by way of the pipe $w$, arranged at the lowest point of the receptacle, while it is discharged through the pipe $v$, arranged at the highest point, so that the vapor developed and the gas that is formed in the milk may be discharged from the receptacle. At suitable but different heights thermometers $x$ and $y$, Fig. 4, are placed in the milk, so as to designate the temperature of the milk at different heights.

About the only difference in construction between the cooler and the heater is that the former is not equipped with a stirrer. The cooler consists of the upright preferably cylindrical receptacle A' for the reception of the heated milk, and this receptacle is inclosed on its entire circumference and at the bottom in a cooling-mantle $a'$, and is equipped with the cooling-body B'. This cooling-body is provided with a cavity $b'$, which is divided by the plate C' into two closed chambers $d'$ and $e'$, and with the tubes $f'$ and $g'$, connecting with the cavity. The tubes $f'$ are closed at their lower end and open at their upper end and are inserted tightly in the bottom plate $h'$, so that the open ends communicate only with the lower chamber $d'$. The tubes $g'$ are open at both ends and are inserted at their upper ends into the plate $c'$ in such manner that they occupy the center of the tubes $f'$, their lower end reaching nearly to the bottom of the tubes $f'$. Water is generally used for cooling, but any other liquid or gaseous medium may be made use of. The cooling medium is passed into the lower chamber $d'$ through the pipe $i'$, and flows from there downward through the cooling-pipes $f'$ and then upward through the narrower tubes $g'$ into the upper chamber $e'$ and is then discharged through the pipe $k'$.

The cooling medium is admitted into the cooling-mantle $a'$ through the pipe $l'$ and discharged through the pipe $m'$. The bottom $h'$ of the cooling-body serves as cover for the receptacle A' and is tightly jointed to the same by means of thumb-screws $n'$. The milk is brought into the receptacle through the pipe $u'$, located at the lowest point, and is discharged through the pipe $v'$, located at the highest point, Fig. 7. As is the case in the heater, thermometers $x'$ $y'$ are placed at different heights in the cooler, in order to show the temperature of the milk in the receptacle A' at different heights.

The equipment and construction of the apparatus vary in accordance with the work to be performed and with the local circumstances. For dairy purposes it is sufficient when the skim-milk is made durable and wholesome for a few days. To this end the skim-milk must, during a certain time, be kept at a temperature of 75° to over 100° centigrade, so as to kill all germs contained therein. Special care is to be taken that during the heating a burning of the milk be prevented and that the milk-foam be left behind when the skim-milk is passed into the heater. The burning is avoided by the use of stationary or rotary hanging or standing heating surfaces, probably in combination with a stirrer, which will prevent the settlement of fixed bodies contained in the milk and formed during the treatment, while the foam is kept back by means of a foam-trap C located in the milk-supply pipe $w$. This foam-trap C, Fig. 1, consists of a receptacle provided at its lower end with a branch pipe 1 2 for the supply and discharge of the milk, and wherein is located a float 3, closing an aperture 4 in the cover of the receptacle as soon as it is pushed upward by foamless-milk.

The float 3 goes down as soon as the specifically lighter foam collects in the receptacle, and allows the latter to escape through the aperture 4.

The location of the heater A and the cooler A' with regard to each other can be varied; but the simplest is that whereby the cooler A' is placed only so much lower than the heater as is necessary to allow the contents of the heater to pass freely into the cooler. This arrangement is shown in Fig. 9. If the cooler cannot be placed sufficiently low, it will be necessary to employ some means to discharge the contents from the heater into the cooler. The operation of my improved form of apparatus when used for the sterilization of milk is as follows: The heater A is first filled with milk until milk flows from the test-cock 5, arranged in the pipe $v$, Figs. 1 and 9. This cock is then closed and the supply of milk is cut off. During the supply of this first quantity of milk the stirrer is set in motion and must be kept in motion until all the milk shall have been discharged from the heater. As soon as the heater is thoroughly filled the heating medium is admitted into the heating-mantle $a$ and the heating-body B. As soon as the thermometers $x$ and $y$ show that the milk has obtained the desired highest temperature, the supply of fresh milk is again opened and is now kept open as long as the process is carried on. The milk will then continually flow through the pipe $v$ and through the pipes 6 7 toward the feed-pipe $v'$ of the cooler A', and thus pass into the same, the admission and discharge pipes of the cooling medium having meanwhile been opened. The hot milk passing into the cooler A' will gradually fill the same and be meanwhile cooled and be finally pushed through the pipes $v'$, 8 9, and flow toward the filling-place, where it is discharged in the usual manner into shipping-cans.

When the whole supply of milk to be heated has passed into the heater, and as soon as this last supply is sufficiently heated, the supply of steam into the heating-mantle $a$ and the heating-body B is cut off and the cock 10 at the lower end of the heater A is opened, so that the contents of the heater passes through the pipes 11, 12, and 7, into the cooler A', after having enabled the cooled milk to flow off into the shipping-cans by opening the cock 13, Fig. 9. If after the emptying of the heater no more milk should flow out at this cock 13, then the cooler is emptied by means of the cock 14. Then the stirrer is stopped and the entire apparatus and pipes are cleaned in the usual manner. This before-described treatment is usually not sufficient when the skim-milk or whole milk treated must be kept for a long time in a wholesome state. In this case the following treatment of the milk is required:

The milk to be treated, provided the same is whole milk, is first freed from the taints and impurities contained therein; but such purification will not be necessary in the case of skim-milk, as the same will already have been accomplished by the centrifugal machine. Such milk is then heated in the manner above described to 105° to 120° centigrade, kept at the highest temperature for some time, then relieved from the gas absorbed, next cooled in the before-described cooler to 12° to 15° centigrade, and then emptied into previously-sterilized vessels, as hereinafter described. In this operation I also prefer to make use of a device called, for convenience, a "gas-trap," for removing the air and gas from the milk, which gas-trap D, when used, is suitably arranged between the heater and cooler in the pipe or conduit forming the communication between the same, as shown at D, in Fig. 11, a detail view of such gas-trap D, in central vertical section thereof, being shown in Fig. 10. Such gas-trap, Fig. 10, consists of the receptacle 15, provided with a removable cover 16, in order to facilitate the cleaning of the same. The milk from the heater flows into this receptacle through the orifice 17 and passes out through the passage 18 into the pipe leading to the cooler. Within this receptacle 15, loosely arranged upon brackets 21, are pieces 19 and 20 of substantially the shape shown, while a piece 22 is rigidly connected to the cover. Before the feed-opening is placed a closed safety-valve 23, and a second safety-valve 24 is located upon the cover 16.

When this gas-trap is used, the operation of the apparatus is as follows: In the first place the heater A is filled with milk until milk flows through the test-cock 5. During this filling the stirrer is set in motion, and as soon as the heater is thoroughly filled and the supply of milk is cut off the steam is admitted into the heating-mantel $a$ and the heating-body B. When the temperature of the milk in the heater A is raised to 105° centigrade, or more, the safety-valve 23, which is weighted in accordance with the highest temperature, is raised, whereupon the supply of milk into the heater is at once reopened and kept open during the entire process. The milk will thus be constantly at the highest temperature while passing through the heater. Through the safety-valve 23 the milk passes into the receptacle 15, which, as stated before, is provided with the second safety-valve 24, not as heavily weighted as 23. In consequence of this difference in tension between the valves, the gas, air, and steam bubbles will readily and thoroughly be separated from the milk and escape through the safety-valve 24, while the plates 19, 20, and 22 will, by their position and shape, prevent the milk from being carried along with the air and gas, while the milk thus freed from air and gas will flow through the pipes 25 and 26 into the cooler A' and pass upwardly through the same, where it will be cooled and will then flow off through the pipe $v'$ to the tapping device E, Fig. 11, through pipe 27. This tapping device is separately shown in detail in Figs. 12, 13, and 14. It consists of the three-way cock, arranged between the milk-pipe 29 and the steam-pipe 30 in such manner as to rotate with its connections as a pivot. The vessel 31, wherein the milk is drawn off and which is provided with a special cover 32, is tightly connected, when the same is to be filled, with said cock 28, by the medium of a second cock and connection 33, preferably permanently and rigidly secured to the cover 32 of the shipping-can 31, which is secured to such shipping vessel or can in a perfectly air-tight manner. Such cover 32 is also provided with an automatically outwardly and upwardly opening-valve 35, located in a passage leading to the interior of the can, in which is also located a stop-cock 34, and the cock 33 is also preferably equipped with a tube 36 reaching nearly to the bottom of the vessel. When the vessel 31 is connected to the three-way cock 28, the cock 28 must be placed in the position shown in Fig. 13 and the cocks 33 and 34 be opened. The vessel 31 is then turned upward, as illustrated in Fig. 13, and the steam-cock 37, located in the pipe 30, leading to the steam-supply, is then opened. The steam thus enters into the vessel 31 at its highest points and the heavy air and condensing water are driven out through the cock 34 and the valve 35, so that the vessel will be thoroughly sterilized. As soon as this is accomplished the vessel 31 is turned downward in the position shown in Fig. 12, when the valve 35 will automatically close against the admission of air, the steam-cock 37 is then closed and the three-way cock 28 is brought in the position shown in Figs. 12 and 14, when the cooled milk will fill the can until the same overflows through the valve 35, whereupon the three-way cock 28 and also the two cocks 33 and 34 are closed and the vessel 31 is then disconnected and removed to make room for a second similar vessel, which is again filled in the same manner. Steam may also be used to thoroughly sterilize the entire device before starting the operation of sterilization, and when so used the cocks 10 and 13 are opened and the three-way cock 28 is placed in the position shown in Fig. 12. The steam is then admitted into the heater by way of the pipe 38, Fig. 4, and from there the steam will rush through the whole plant. The air and condensed water will be driven out through the three-way cock 28 and all places entered into by the milk will be thoroughly cleaned and sterilized.

The modified form of heater for my improved sterilizing apparatus illustrated in Figs. 5$^a$ and 6$^a$ may be used also for cooling, and the same consists of a cylindrical or prismatic receptacle $A^2$, provided with the two perforated end pieces $a^2$ $a^3$, wherein several tubes $b^2$ are tightly inserted.

Tubes $c^2$ are suspended in these tubes $b^2$, and are connected with a closed hollow body $B^2$, which is divided in two closed chambers $d^2$ and $e^2$. These tubes $c^2$ are open at the top and closed at the bottom, and still narrower tubes $f^2$ are suspended in the same that are open at both ends and are tightly inserted in the plate $r^2$ separating the two chambers $d^2$ and $e^2$.

The receptacle $A^2$ is provided at both ends with a chamber $g^2$ and $h^2$, the upper one $g^2$ being closed by $B^2$, and the lower one $h^2$ by the bottom plate $k^2$, but so that the closing bodies can be easily disconnected.

The liquid to be heated or cooled is admitted through the pipe $l^2$ and raises in the annular spaces left between the tubes $b^2$ and $c^2$, and is then discharged through the pipe $m^2$. On this passage the liquid is heated or cooled by both the tubes $b^2$ and $c^2$, as the heating or cooling medium is admitted through the pipe $n^2$ into the receptacle $A^2$, and likewise through the pipe $p^2$ into the tubes $c^2$. The heating or cooling medium admitted through $n^2$ passes around the tubes $b^2$ and is discharged through the pipe $o^2$, and the heating or cooling medium in the tubes $c^2$ passes through the narrower tubes $f^2$ into the chamber $e^2$ and is thence discharged through the pipe $q^2$. By loosening the connection of the hollow body $B^2$ with the chamber $g^2$, the body $B^2$, with the tubes $c^2$, can be easily lifted and removed, and by opening the bottom piece $k^2$ all spaces and surfaces coming into contact with the liquid to be heated or cooled can be thoroughly cleaned by hand. The only difference between such device and that shown in the other figure is that a more energetic heating or cooling is obtained by reason of the fact that the liquid to be heated or cooled in passing through the apparatus is divided into jets or streams of an annular cross-section, and thus is acted upon by the heating or cooling medium at both the inner and outer surface thereof. In the annexed drawings, Figs. 5$^a$ and 6$^a$, the arrows show the preferred course of the liquid when the apparatus is used as a heater, and if used as a cooler the course is preferably in the opposite direction to that shown.

When it is desired to have the operation a continuous one a separate heater and cooler are, of course, required, but in cases in which only a small quantity of milk or other liquid is to be treated daily the heater may, after the heating, be turned into a cooler by shutting off the flow of the heating liquid and substituting a cooling one in place thereof.

It is also evident that many modifications in the construction, combination and arrangement of the various parts of my improved sterilizing apparatus, other than those shown and described herein, may be made without departing from the scope of my invention, and I do not intend to limit myself to the exact form of construction shown; but, Having now particularly described my said invention, its construction and operation, what I claim, and desire to secure by Letters Patent, is—

1. In a heater or cooler for sterilizing apparatus, the combination with a chamber for holding the liquid to be sterilized, of inlets and outlets to such chamber, located one at the top and the other at the bottom, a cover for the receptacle formed with a chamber in the same, a horizontal diaphragm dividing the chamber in the cover into two parts, tubes closed at the bottom and open at the top inserted in the bottom plate of the cover and communicating with the lower chamber thereof, smaller tubes open at both ends inserted in the dividing diaphragm extending into the first tubes and communicating with the upper chamber of the cover, an inlet to the lower chamber of the cover, and an outlet to the upper chamber, substantially as shown and described.

2. In a heater or cooler for sterilizing apparatus, the combination with a chamber for holding the liquid to be sterilized, of inlets and outlets to such chamber, located one at the top and one at the bottom, an annular chamber surrounding the first chamber also provided with an inlet and outlet at the top and bottom thereof, a cover for the receptacle formed with a chamber in the same, a horizontal diaphragm dividing the chamber in the cover into two parts, tubes closed at the bottom and open at the top inserted in the bottom plate of the cover and communicating with the lower chamber thereof, smaller tubes open at both ends inserted in the dividing diaphragm extending into the first tubes and communicating with the upper chamber of the cover, an inlet to the lower chamber of the cover, and an outlet to the upper chamber, substantially as shown and described.

3. In a heater or cooler for sterilizing apparatus, the combination with a chamber for holding the liquid to be sterilized, of inlets and outlets to such chamber, located one at the top and the other at the bottom, a cover for the receptacle formed with a chamber in the same, a horizontal diaphragm dividing the chamber in the cover in two parts, tubes closed at the botton and open at the top inserted in the bottom plate of the cover and communicating with the lower chamber thereof, smaller tubes open at both ends inserted in the dividing diaphragm extending into the first tubes and communicating with the upper chamber of the cover, an inlet to the lower chamber of the cover, an outlet to the upper chamber, and a stirrer located in the sterilizing chamber and adapted to be rotated therein as desired, substantially as shown and described.

4. In a sterilizing or similar apparatus, the combination with the heater or like receptacle thereof, of a foam-trap located in the inlet pipe thereof, substantially as shown and described.

5. In a heater or cooler for sterilizing apparatus, the combination with two chambers located one above the other for receiving the liquid to be sterilized, of a series of tubes forming communication between the two chambers, an annular casing forming a closed chamber around said tubes an inlet and an outlet to such closed chamber, an inlet to the lower chamber, and an inlet to the upper chamber, a cover for the upper chamber having an upper and lower chamber therein divided one from the other by a horizontal diaphragm, a series of tubes open at the top and closed at the bottom secured in the bottom plate of the cover communicating with the lower chamber of the cover and extending through the communicating tubes into the lower chamber of the receptacle, a series of tubes open at both ends secured in the dividing diaphragm of the cover communicating with the upper chamber thereof and extending into the tubes closed at the bottom, an inlet to the upper chamber of the cover, and an outlet to the lower chamber thereof, substantially as shown and described.

6. In a sterilizing or similar apparatus, the combination with a heater or like receptacle, of an outlet pipe 6 in communication therewith, a gas and air-trap D in communication with the pipe 6, through a normally closed check valve 23 opening a way from the heater, an outlet pipe 25 in communication with the lower part of the trap D, and an outwardly opening automatic safety valve 24, in communication with the upper portion of the trap D, substantially as shown and described.

7. In a sterilizing or similar apparatus, the combination with a heater or like receptacle, of an outlet pipe 6 in communication therewith, a gas and air-trap D in communication with the pipe 6 through a normally closed weighted check-valve 23, opening away from the heater, an outlet pipe 25 in communication with the lower part of the trap D, and an outwardly opening automatic safety-valve 24 in communication with the trap D, and more heavily weighted than is the valve 23, substantially as described.

8. In a sterilizing or similar apparatus, the combination with a heater or like receptacle, of a pipe in communication with the heater, a trap D in communication with the pipe and having an air or gas outlet in the upper and a liquid outlet in the lower portion, a valve for closing the liquid outlet, and a float in the trap the raising and lowering of which will actuate the valve so as to open and close the liquid outlet of the trap, substantially as shown and described.

In witness whereof I have hereunto set my hand in presence of two witnesses.

FRITZ AUGUST KLEEMANN.

Witnesses:
JOHANNES BRANDS,
GUSTAV WILLNER.